United States Patent Office 3,486,627
Patented Dec. 30, 1969

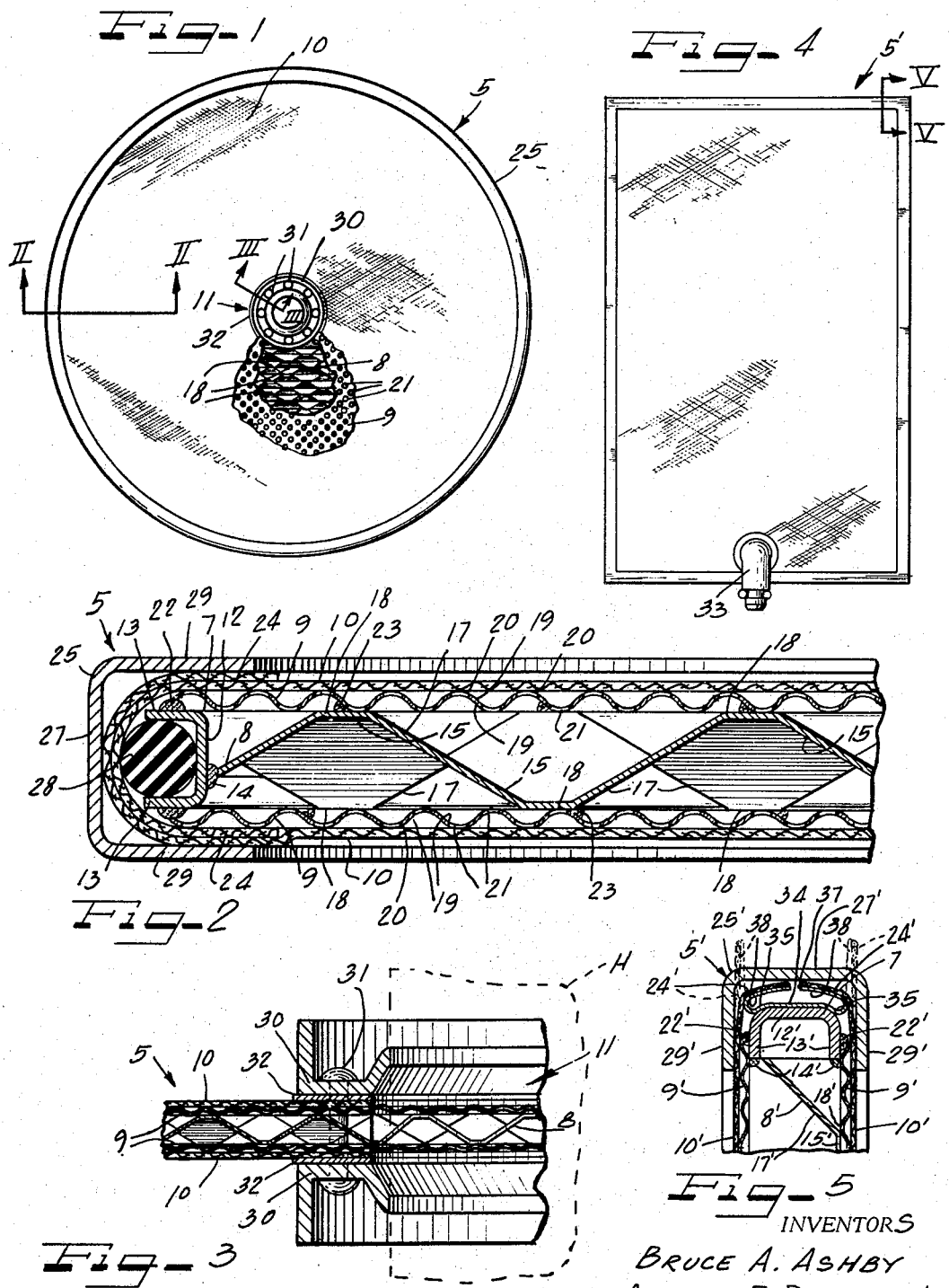

3,486,627
FILTER LEAVES
Bruce A. Ashby, Gardena, and Arthur E. Pearson, Jr., Anaheim, Calif., assignors, by mesne assignments, to The Carborundum Company, Niagara Falls, N.Y., a corporation of Delaware
Filed Feb. 21, 1967, Ser. No. 617,607
Int. Cl. B01d *39/10*
U.S. Cl. 210—486                                    11 Claims

ABSTRACT OF THE DISCLOSURE

Filter leaves of either one- or two-sided form comprise a boundary frame supporting in peripheral attachment thereto a substantially rigid body plate having a pattern of adjoining discontinuous indentations and intervening projections supporting a perforated semi-rigid backing sheet on which is carried a filtering medium, such that filtrate flows through the filtering medium and the backing sheet into passageway between said projections and thence to a discharge outlet.

---

This invention relates to the art of filtration and more particularly concerns improvements in filter leaves used in filters, generally in a battery of such filter leaves. In this kind of filter, either the liquid is introduced into a closed vessel to pass under pressure into and through the filter leaves and into a discharge header; or a vacuum or suction is applied through the header and the liquid to be filtered is introduced into an atmospheric pressure tank and forced through the leaves by atmospheric pressure by virtue of the suction.

Heretofore filter leaves of the character indicated have been constructed using wire mesh of various sieve counts, perforated sheets separated by short pieces of bar stock, thick plates grooved to permit flow, and combinations of these structures. Some of the problems experienced with prior filter leaves have been, restriction in the internal leaf flow, weakness of construction, poor differential pressure characteristics, and manufacturing difficulties.

An important object of the present invention is to provide a lightweight, high strength, economical filter leaf construction capable of withstanding high differential pressure during filtration.

Another object is to provide a filter leaf construction that affords as nearly as practicable unrestricted internal flow to the discharge outlet.

A further object is to provide a relatively smooth, flat, outer face area on the filter leaf that is readily adapted for easy and efficient cleaning, either automatically or manually, using any preferred cleaning expedient such as scraping, sluicing, and the like.

Still another object is to provide a filter leaf that is provided with a substantially non-flexing, efficient supporting surface for fine mesh filtering medium.

Yet another object is to provide a substantially new and improved core or body structure for filter leaves.

A still further object of this invention is to provide a new and improved boundary rim structure for filter leaves.

It is also an object to provide a new method of making filter leaves.

Other objects, features and advantages of the present invention will be readily apparent from the following detailed description of certain preferred embodiments thereof taken in conjunction with the accompanying drawing, in which:

FIGURE 1 is a face elevational view of a filter leaf according to the principles of the invention, partially broken away to show details of structure;

FIGURE 2 is an enlarged fragmentary sectional detail view taken substantially along the line II—II of FIGURE 1;

FIGURE 3 is an enlarged sectional detail view taken substantially along the line III—III of FIGURE 1;

FIGURE 4 is a face elevational view of a modified form of the filter leaves according to the principles of the invention; and FIGURE 5 is an enlarged fragmentary sectional detail view, taken substantially on the line V—V of FIGURE 4.

According to the invention, single sided or double sided filter leaves are provided and for purposes of illustration a double sided filter leaf 5 (FIGS. 1–3) is depicted in detail, both sides of which may be used simultaneously for filtration, but if preferred may be constructed with only one active side. This filter leaf comprises a boundary rim frame 7, a substantially rigid body plate 8 within the frame, a semi-rigid perforated backing sheet 9 on one or both faces, a pervious filtering medium 10 covering and supported on the backing sheets, and an outlet 11 for discharge of filtrate from the core of the filter leaf.

Desirably, the frame 7 is of generally U-shaped channel form transverse cross section with the channel opening, in this instance, toward the outer perimeter and providing a ring member of any preferred geometric configuration, being shown as circular, although it may be of any other desired configuration such as square, rectangular, oval or any combination of these configurations to meet space and operating requirements. The frame member 7 may be made of rolled, extruded, or other type of bar stock or specially made shape, as preferred. An inner frame member web or wall 12 of predetermined width faces inwardly within the confines of the frame and provides reinforcement for and is reinforced by outwardly extending opposite spaced side wall flanges 13.

As rigid but yet lightweight construction as practicable is provided for the body plate 8. For this purpose, it may be die shaped by pressing or molding, or it may be cast, as may be deemed most desirable for any particular use and material from which made. Attachment of the body plate 8 about its perimeter edge within and to the frame 7 is in any suitable manner compatible with the material from which the frame and plate are made. Where the materials of these members are metal, welding, brazing of soldering 14 may be employed to attach the plate perimeter to the inner web wall 12 of the frame. Where the members are of a hardened plastic material the attachment 14 may be a suitable bonding material.

In a desirable assembled relationship, the body plate 8 supports the backing sheets 9 in a plane with the outer surfaces of the frame flanges 13. For this purpose, the body plate 8 is provided on its faces with a pattern of adjoining indentations 15 and intervening projections 17 which are desirably of uniform shape, discontinuous, and in overall uniform arrangement. In a preferred form, the indentations and projections are of a multi-sided outline in plan, and each of the projections 17 has a peak 18 which may be of limited width and even afford only a substantially point contact crown area. All of the peaks 18 on each face of the body plate are in a substantially common plane, and more particularly in a plane with the associated side plane of the frame 7.

By virtue of constructing the adjoining oppositely extending projections 17 with common walls, substantially free filtrate flow passageway is afforded between the projections along the faces of the plate. Through this passageway the filtrate can flow from every direction toward the discharge outlet 11. Further, it will be noted that because of the angular relationship of the adjoining walls of the projections 17, mutual reinforcement is afforded over the entire area of the body plate 8, permitting the use of relatively lightweight, minimum gauge material in the plate while attaining the desired substantial rigidity for efficient backing-sheet-supporting function.

Because of the substantial rigidity of the body plate 8, the backing sheets 9 may be of as thin gauge as will afford the desired semi-rigidity in these sheets, when supported on the peaks 18, against any appreciable inward deflection under filtration pressures. Suitable sheet metal, sheet plastic or thin cast sheet may be utilized in the backing sheets 9. For reinforcement and free filtration flow characteristics, each of the sheets 9 is provided with a pattern, preferably overall, of dimples 19 and intervening projections 20 on each face, such that the inwardly extending projections 20 aligned with the respective body plate peaks 18 will engage in supported relation thereagainst. For free filtration flow through the backing sheets 9, they have a pattern of relatively closely spaced sizeable perforations 21 therethrough. At their outer margins, the sheets 9 desirably overlap the frame flanges 13 and are secured thereto as by means 22 comprising welding, bolting, brazing, bonding, or the like. Substantial rigidity of the filter leaf core as provided by the body plate 8 and the backing sheets 9 is enhanced by securing together the contacting peaks 18 and dimple projections 20, as by means of welding, brazing, bonding, or the like, 23.

On and over the hollow filter leaf core thus provided, the filter medium 10 is mounted so that by filtering pressure differential fluid to be filtered will flow through the filtering medium and the backing sheets and then through the passageway provided by the body plate 8 to the discharge outlet 11. Any desired sheet-form filtering medium may be employed such as fine mesh metallic or plastic screen of woven or other type, synthetic or natural fiber felted or woven fabric, and the like. One or more sheets of the filter medium 10 may be employed and affixed in covering and supported relation on the backing sheets 9 in desirably sufficiently taut relation to minimize deflection of the filtering medium into the dimple depressions 19, but maintaining substantially point contact with the rounded peaks of the outwardly extending dimple projections 20, for efficient flow of filtrate after deposit of the solids to develop a filter cake on the outer surface of the filtering medium.

While the filtering medium sheets 10 may be attached by means of drawstrings, welding, bonding and the like, or combinations of these or other expedients, respective marginal flanges 24 of the filtering medium sheets 10 may be wrapped about the boundary frame in relatively overlapped relation and secured in place. Protectively encasing the overlap flanges 24 is a rim capping ring 25 of inwardly opening channel shape which is drawn up about the perimeter of the boundary frame and the flanges 24. The relationship may be such that the ring 25 has triple clamping engagement with the overlapped filtering medium flanges. A circular web body wall 27 of the member 25 may clampingly thrust against the overlapped flanges 24 inwardly toward the frame member 7, with a resilient, elastomeric clamping base O-ring 28 desirably mounted in the channel of the frame member 7 and projecting outwardly therefrom in opposition to the web wall 27. At each opposite side, the protective retaining ring 25 has inwardly extending flanges 29 which may clamp the respective terminal portions of the overlapped filtering medium flanges 24 against the sides of the supporting core as represented by the adjacent underlying margins of the backing sheets 9. While the member 25 may be a one-piece continuous spun ring, it may also be made as a split ring having its ends bolted, welded, brazed or otherwise secured together in the assembly.

In the circular form of the filter leaf 5, the discharge outlet 11 is desirably located at the center of the unit and comprises a suitably dimensioned aperture through the laminas of body plate 8, backing sheets 9 and filtering medium 10, with suitable coupling structure by which the leaf is adapted to be mounted in delivery relation to a discharge header H which is schematically shown in FIGURE 3. For this purpose there is desirably provided a pair of oppositely channel-shaped complementary hub rings 30 which are secured in clamping relation to the filter assembly therebetween about the discharge opening, as by means of bolts or rivets 31, with respective gaskets 32 between the clamping portions of the hub rings and the filtering medium facing sheets 10.

Instead of a central discharge outlet, any other suitable discharge outlet structure may be provided such as a bayonet type discharge nozzle 33 as shown in FIGURE 4. This is especially suitable for a filter leaf 5' of straight sided configuration such as the vertically arranged rectangular form shown, wherein the outlet nozzle 33 is in the lower portion of the unit.

Although the filter leaf 5' of FIGURE 4 may embody the same construction as the filter leaf 5 of FIGURES 1 and 2, it may comprise the hollow core and frame rim construction best visualized in FIGURE 5, and which construction may, alternatively, be used in the filter 5, if preferred. Basically, this modified construction is much the same as that already described and therefore primed reference numerals are employed to designate similar elements. In this instance, the frame ring member 7' is of generally U-shaped channel form transverse cross-section, but with the channel opening toward the interior of the hollow core and with the perimeter of the body plate 8' secured as by welding 14' to the opposing edges of the flanges 13'. Attachment of the semi-rigid perforated backing sheets 9' in lapped relation to the flanges 13' is by means such as the welding 22'.

In the construction of the filter leaf 5', the filter medium sheets 10' have their marginal flanges 24' affixed to an anchor ring 34 which, in a desirable form, is formed of sheet metal and seats on the outwardly facing surface of the web 12' of the frame member 7', to which it may be secured in suitable manner as by welding, bonding or the like. Retention against relative axial displacement of the ring 34 and the ring 7' may be affected or supplemented by turning or upsetting of marginal portions 35 of the web of the ring 34 onto the juncture shoulders between the web 12' and the flanges 13' of the ring 7'.

Where the filter medium sheets 10' are of suitable mesh metallic screen, the marginal flanges 24' thereof may be secured as by means of welding, bonding, or the like of 37 to respective side flanges 38 of the ring 34 which, as shown, are turned over toward the web of the ring 34 and toward one another. Instead of welding, rivets may be used to secure the flanges 24' to the flanges 38. Where the filter medium sheets 10' are nonmetallic they may be bonded to the flanges 38 by means of suitable epoxy or other resin, riveted, clipped on, or otherwise suitably secured.

In order to effect tightening of the respective filter medium sheets 10', the flanges 38' are desirably initially in substantially parallel, radially outwardly extending relation as shown in dot-dash outline. Then the margins of the respective filter medium sheets are respectively secured fixedly to the flanges 38, and the flanges 38 with the marginal flanges 24' are then bent toward one another as by rolling, whereby the filter medium sheets are respectively drawn uniformly toward the margins and the sheets tightened. Thereafter, the protective rim capping ring 25' is applied in encasing relation over the flanges 24' and the adjacent sides of the rim structure and secured in place to complete the assembly.

It will be understood that variations and modifications may be effected without departing from the spirit and scope of the novel concepts of this invention.

We claim as our invention:
1. A filter leaf comprising, in combination:
   a substantially rigid hollow core including a boundary structure;
   a flanged sheet metal rim member having a portion seated on the outer perimeter of the boundary structure and having a flange turned from one side into overlying relation to said portion;

and a filtering medium sheet supported in covering relation on said core and having a marginal flange secured to said rim member flange and maintaining said sheet tensioned.

2. A filter leaf according to claim 1, in which said boundary structure comprises a ring, said rim member comprising a ring in which said seated portion comprises a web, said web having opposite margins comprising said flange and a second flange turned toward the first mentioned flange, a second filtering medium sheet supported in covering relation on said core and having a marginal flange secured to said second flange and maintaining said second sheet tensioned, said rim member ring having means adjacent to juncture of said flanges with said web engaging with said boundary structure ring whereby to maintain said rim member ring against axial displacement from said boundary ring.

3. A filter leaf comprising, in combination:
a rigid boundary ring frame;
a substantially rigid body plate attached to and supported about its perimeter by and within said frame and having a face pattern of adjoining indentations and intervening projections sloping from all directions to respective peaks in a common plane with a plane across an outer side of said boundary frame and with relatively free filtrate flow passageway between the projections along the plate and in all directions within said frame;
a semi-rigid perforate backing sheet supported on the peaks of said projections against any appreciable inward deflection under fluid filtration pressure and having a margin overlapping and secured to said outer side of said boundary frame;
a filtering medium sheet covering and supported on said backing sheet and having a margin secured to said frame;
and an outlet for discharge of filtrate from said flow passageway.

4. A filter leaf according to claim 3, including means securing said backing sheet to peaks of said projections.

5. A filter leaf according to claim 3, said body plate comprising relatively thin gauge material and said indentations and intervening projections being of discontinuous respectively oppositely extending mutually reinforcing common wall form and having a multi-sided respective outline having said peaks of substantially point contact crown area.

6. A filter leaf according to claim 3, said backing sheet having a pattern of shallow dimples therein providing projections engaging and secured to said peaks, said dimples facilitating filtration flow from said filtering medium through said backing sheet to said passageway.

7. A filter comprising, in combination:
a rigid boundary frame;
a substantially rigid body plate secured within said frame and having a face pattern of adjoining indentations and intervening projections wtih peaks projecting outwardly and defining relatively free filtrate flow passageway between the projections along the plate to a discharge outlet;
a semi-rigid perforate backing sheet over said body plate;
and a filtering medium covering and supported on said backing sheet;
said backing sheet comprising a thin gauge sheet material having a continuous reinforced pattern of contiguous shallow dimples and intervening projections toward both opposite faces thereof with said dimples engaging against said peaks and the projections of said backing sheet supporting said filtering medium spaced from depressions defined by said dimples and to facilitate inflow of fluid from the filtering medium to and through perforations in the backing sheet and into said passageway.

8. A filter leaf comprising, in combination:
a rigid boundary frame;
a substantially rigid body plate structure supported by and within said frame;
a filtering medium sheet over a side of said body;
an elastomeric backing member carried on and along said frame;
a margin of said filtering medium sheet engaged against said elastomeric member, with said sheet tensioned;
and a clamping member engaging against said margin and pressing it against said elastomeric member and thereby maintaining said filtering medium sheet tensioned by the clamping of said margin against said elastomeric member.

9. A filter leaf according to claim 8, comprising filter sheets on opposite sides of said body, each of said filter sheets having a margin, said margins being in overlapping oppositely extending relation and overlying said elastomeric member and said clamping member clamping the overlapped margins against said elastomeric member.

10. A filter leaf comprising, in combination:
a rigid boundary frame having a ring member of peripherally outwardly opening channel shape presenting an inwardly facing web wall and spaced apart outwardly projecting side flanges;
a substantially rigid body plate attached to and supported within said frame and comprising a relatively thin gauge material with indentations and projections of discontinuous respectively oppositely extending mutually reinforcing common wall form and multi-sided outline in plan having peaks of limited contact crown area and in a common plane with the opposite side flanges of said boundary frame, and providing flow passageway between the projections enabling flow from every direction along both sides of said plate toward said outlet;
perforate backing sheets having margins thereof respectively secured to opposite ones of said boundary frame side flanges and each comprising a uniform pattern of dimples providing inward and outward projections with the inward projections engaging said peaks on the respective opposite sides of said body plate;
filtering medium comprising a pair of filter sheets engaging against said backing sheets across said outward projections and having respective marginal flanges overlappingly disposed and engaging about said boundary frame;
said boundary frame having a resilient ring in said channel projecting peripherally therefrom and providing a clamping base against which said overlapping marginal flanges are engaged;
and an inwardly opening protective channel-shaped rim-encasing member engaged over said frame and clamping said marginal flanges against said resilient clamping base ring and clamping the extremity portions of said marginal flanges toward said backing sheets.

11. A filter leaf comprising, in combination
a boundary frame having a ring member of peripherally inwardly opening channel shape providing an outwardly facing web wall and spaced apart inwardly projecting side flanges;
a substantially rigid body plate attached to and within said ring member and comprising a relatively thin gauge material with indentations and projections of discontinuous respectively oppositely extending mutually reinforcing common wall form and multi-sided outline in plan having the peaks thereof in a common plane with the opposite side flanges of said ring member, and providing flow passageway between the projections enabling flow from every direction along both sides of said plate toward an outlet;
perforate backing sheets having margins thereof respectively secured to the opposite ones of said ring member flanges and engaging said peaks;

an anchor ring mounted about the outer face of said web wall and having respective side flange portions projecting toward one another;

filtering medium comprising a pair of filter sheets backed against said backing sheets and having respective marginal flanges secured under tension to said anchor ring flanges whereby to maintain said filter sheets substantially tight;

and an inwardly opening protective channel-shaped rim-encasing member engaging over said tensioned filter sheet marginal flanges and along the sides of the boundary frame.

References Cited

UNITED STATES PATENTS

| | | | |
|---|---|---|---|
| 2,582,311 | 1/1952 | Creswick et al. | 210—346 X |
| 2,781,133 | 2/1957 | Thompson | 210—347 X |
| 3,262,577 | 7/1966 | Tuit | 210—487 |
| 3,294,241 | 12/1966 | Sicard et al. | 210—347 X |
| 3,263,819 | 8/1966 | Schmidt et al. | 210—486 |

REUBEN FRIEDMAN, Primary Examiner

JOHN W. ADEE, Assistant Examiner